Sept. 5, 1967
J. KATZ
3,339,798
ARTICLE DISPENSER HAVING A PLURALITY OF
ROTATABLY MOUNTED SOURCES
WITH ACTUATING MEANS
Filed Nov. 18, 1965
2 Sheets-Sheet 1
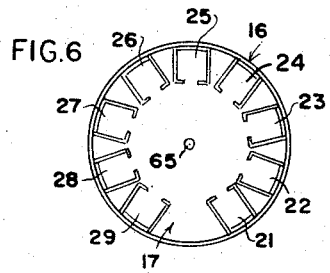
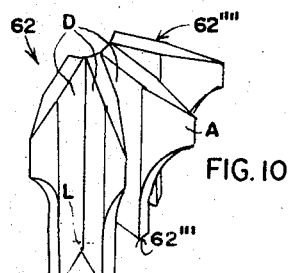
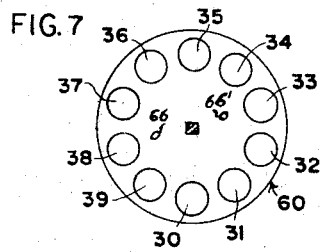
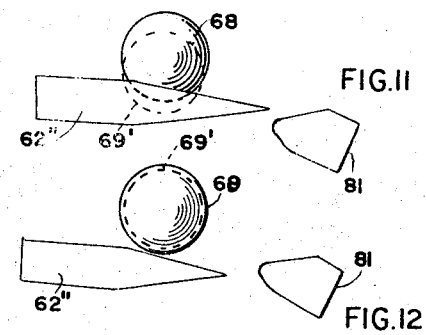
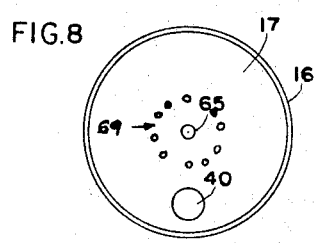
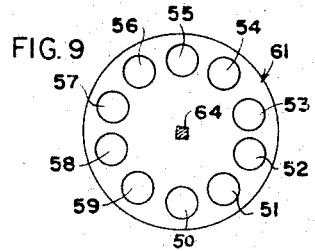
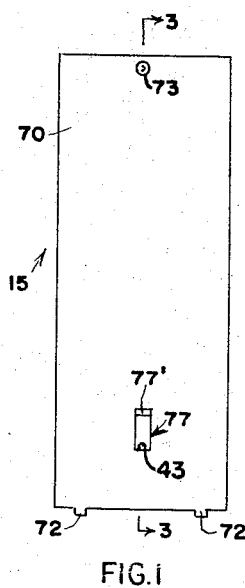
INVENTOR,
Jacob Katz,
BY
ATTORNEY.

Sept. 5, 1967    J. KATZ    3,339,798
ARTICLE DISPENSER HAVING A PLURALITY OF
ROTATABLY MOUNTED SOURCES
WITH ACTUATING MEANS
Filed Nov. 18, 1965    2 Sheets-Sheet 2
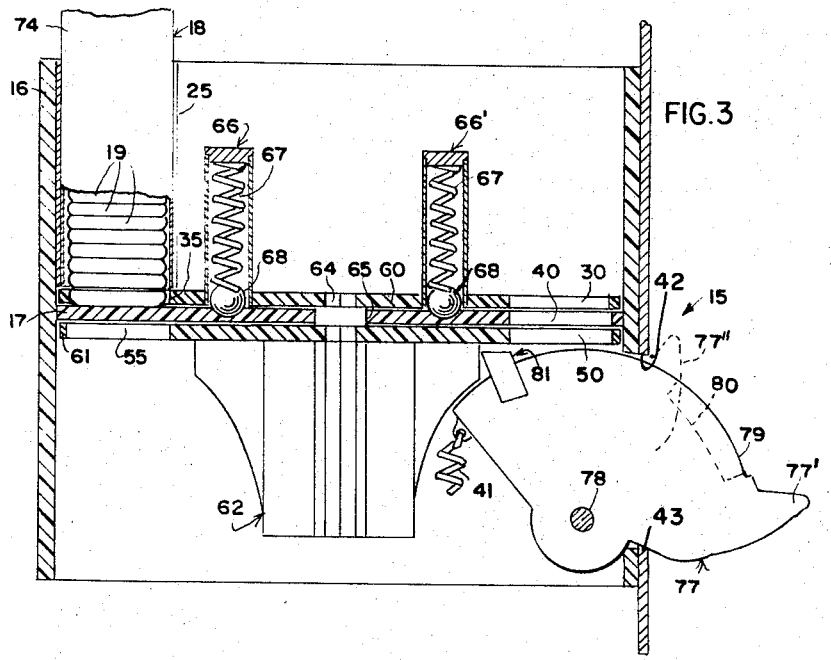
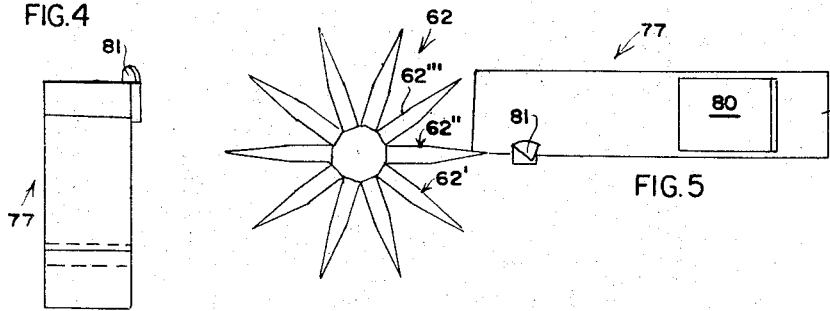
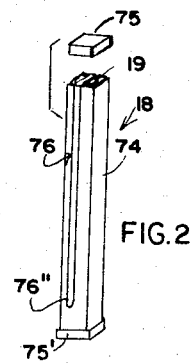
INVENTOR,
Jacob Katz
BY
ATTORNEY.

United States Patent Office 3,339,798
Patented Sept. 5, 1967

3,339,798
ARTICLE DISPENSER HAVING A PLURALITY OF ROTATABLY MOUNTED SOURCES WITH ACTUATING MEANS
Jacob Katz, 225 E. 57th St., New York, N.Y. 10022
Filed Nov. 18, 1965, Ser. No. 508,530
1 Claim. (Cl. 221—113)

ABSTRACT OF THE DISCLOSURE

A disc, having a series of equispaced holes, is atop a fixed plate having a single hole, and directly under stacks of articles to be dispensed one at a time, there being a stack at each hole in the disc except that one which is over the single hole in the plate. Below the plate is a gear structure on a common shaft with the disc, which shaft extends through the plate and is revolvably journalled thereto. A normally at rest, vertically positioned, swingable sector-shaped operating member on a horizontal axis and biased to normal rest position, has an article-receiving socket opening in its arcuate surface which is directly below the single hole in the plate. The gear structure has as many teeth as there are in said series of holes in the disc. A pawl extending radially from said arcuate surface and extending between the dedendums of two successive gear teeth, leaves the gear before the operating member has reached the second position. The pawl moves the gear structure only during the return movement of the operating member to its normal rest position. The extent of such movement is nearly one tooth. To complete the one-tooth shift, there is a spring biased ball plunger on the disc arranged to accomplish this, in conjunction with holes in the plate; the ball being shifted to concentric fit position in the hole, from an eccentric position therein.

---

The present invention relates to dispensing devices, and as an example thereof, one for dispensing one-use soap tablets for use in public washrooms, is shown and described.

The principal object of this invention is to provide a dispensing device of novel and improved construction, for dispensing articles one at a time upon movement of an operating member; the supply comprising a multiplicity of stacks, and successive items dispensed coming from different stacks respectively by action of an automatic indexing mechanism.

Another object thereof is to provide a dispensing device of the character described, of novel and improved construction, which is easy and reasonable in cost to manufacture, simple to operate and efficient in carrying out the purposes for which it is designed.

Other objects and advantages will become apparent as this disclosure proceeds.

For one practice of this invention, the dispensing device comprises a casing which is an open-top cylindrical receptacle. Within said receptacle, there is a disc covering its bottom wall, but slightly spaced therefrom. There is also a similar disc below the receptacle, covering its bottom wall, but slightly spaced therefrom. The thickness of the receptacle's bottom wall and that of each of said discs, is equal to the thickness of a tablet for which the device is designed to dispense. Said discs are mounted on a common rotatably mounted stud so they turn together therewith. Around the inner wall of said casing, the circumference is divided into a number of equally spaced stations, which in the embodiment shown, numbers ten. At each of nine of these stations or locations, there is provision to hold an upright stack of the tablets which are to be dispensed one tablet at a time upon a tenth of a revolution of said revolvable stud. In normal rest position, each disc has a hole directly under each of the stacks, said holes being of a size just to admit one of the tablets. The bottom wall of the casing has a similar hole at the tenth station and so do each of said discs. Said stud or shaft is associated with an indexing mechanism having an operating member, every operation of which causes said shaft to turn one-tenth of a revolution and there is a releasable locking means to hold the rotor assembly at each position it is shifted to. Movement of the indexing device's operating member brings a tablet into an accessible position to be picked out of a socket in said member.

In the accompanying drawings forming part of this specification, similar characters of reference indicate corresponding parts in all the views.

FIG. 1 is a front view of a tablet-dispensing device embodying the teachings of this invention.

FIG. 2 is a perspective view of reduced size, showing a preferred package structure containing a stack of tablets to serve as the supply at one of the magazine sections of said dispensing device.

FIG. 3 is an enlarged section taken at line 3—3 in FIG. 1, showing the operating member in shifted position where it presents a tablet for use.

FIG. 4 is an end view of the operating member included in FIG. 3, as seen from the left.

FIG. 5 is a top plan view of said operating member and the ratchet wheel of special construction, with which it cooperates.

FIGS. 6–9 are parts of this dispensing device drawn to a reduced scale. These parts offer the means to receive the tablets which are the bottom ones in the stacks, and some of them being turned by operation of the indexing device, cooperate with the others to dispense one tablet at a time, for each operation of the operating member. These are top plan views. In FIG. 6, various holes have been omitted to attain clarity of illustration; said holes being shown in FIG. 8.

FIG. 10 is a fragmentary perspective view of the ratchet wheel structure included in the dispensing device which cooperates with a pawl on the operating member of said device, to impart a proper partial turn of the parts shown in FIGS. 7 and 9.

FIG. 11 is an enlarged top plan diagrammatic view showing the relative positions of a tooth of the ratchet structure of FIG. 10, the pawl cooperating therewith and a spring-biased ball, at the time the operating member has been shifted from its normal rest position to cause one tablet to be dispensed.

FIG. 12 is a view like FIG. 11, showing the relative position of said mentioned components when the operating member has returned to its normal rest position, ready for the next operation.

In the drawing, the numeral 15 designates generally a gravity-fed tablet-dispensing device including an open-top cylindrical receptacle 16, whose bottom is the disc 17, and whose cylindrical wall carries adaptors 21–29 on its inner surface, each of which is to receive a package like 18, containing a stack of tablets 19, immediately above a disc 60 within the receptacle 16, which is extremely close to the receptacle's bottom wall 17, and there is a disc 61 extremely close to the underside of said wall 17, having fixed concentrically thereon, the downwardly extending gear-like structure which is designated generally by the numeral 62. The perimeter of the upper disc 61 is very near to the interior surface of the cylindrical wall of the receptacle 16, and the diameter of the bottom disc 61, is at least that of said upper disc. The disc 17 will hereinafter be referred to as the middle disc.

In the embodiment illustrated, the disc 60 has ten holes near its perimeter, which are equi-spaced around a circle. These holes 30–39 are identical and of a size somewhat larger than a tablet 19. The disc 61 has a similar series of holes 50–59, in respective alignment with the series 30–39 in the disc 60. These discs 60 and 61 are fixed on a stud 64, which is a shaft rotatably mounted through the hole 65 in the middle disc 17. It is evident that upon turning the gear-like structure 62, that the upper disc 60 and the lower disc 61 will turn with it. The middle disc 17, has a single hole 40 of the same size as the others and at the same distance from center, hence as the gear-structure 62 is turned, the hole 40 will be in registry successively with successive pairs of holes in the discs 60 and 61.

Spring plungers indicated generally by the numerals 66, 66' are carried on the disc 60, each plunger comprises a tensed compression spring 67, acting on a steel ball 68 which sets into a socket of the series around the circle 69, when the hole 40 of the middle disc 17 is in registry with a pair of aligned holes in the discs 60 and 61. The adaptors 21–29 are above each hole in the upper disc 60, except the one which is over the middle disc's hole 40. Hence there is provision for nine stacks of tablets, there being none above the hole 40.

The receptacle 16 is fixed to a wall for instance, by a suitable bracket, or to a front panel 70, the assembly being arranged to be set into a wall recess (not shown) with provision to receive the downward lugs 72, and to be locked in place by a lock 73, which manner of mounting is believed well understood without further explanation, as means for removal so that the supply of tablets can be replenished.

In place of the adaptors 21–29, there may be tall tubes to carry a stack of tablets each, as is well known in the art, but I prefer to have these short adaptors for the cartridge package structure 18, which pack is a convenient way to market them to users of these dispensing devices. Such package consists of a thin-walled cardboard or plastic square tube 74, closed by end caps 75, 75' and containing a stack of round tablets 19. The cap 75 is removable, and the end it was on, has a tape 76 thereacross, one end 76" of which is adhered by a pressure-sensitive adhesive on one tube wall, and an intermediate portion is likewise adhered to the opposite tube wall, with its other end portion 76", extending along the tube to be accessible to get hold of to pull the tape off said cover tube 74, when the package is set into an adaptor so that its tape-bearing end rests near the upper disc 60.

The numeral 77 designates generally a sector-shaped operating member positioned in a general vertical plane and swingably mounted on a horizontal axis pin 78 on the frame of the device 15. This operating member is through an opening in the front panel 70, where it presents an accessible front finger piece 77'. The arcuate surface 79 of said operating member, which is concentric with the axis pin 78, is uppermost and has therein a socket 80, right under the hole 40, adapted to receive any tablet 19 which falls through said hole 40; said socket being normally behind said front panel; its position being very near said finger piece. There is also a pawl indicated generally by the numeral 81, on said surface 79, for cooperation with the gear-like structure 62, to shift same one tooth at each oscillation of said operating member 77. Said operating member is biased by a spring 41, so that in normal rest position, its pawl 81 is low down between two successive teeth of the gear structure 62, its socket 80 as mentioned, is directly under the hole 40, and the finger piece 77' is in its upward position. When said finger piece is pressed down, the socket 80 is exposed in front of the panel 70, and the pawl 81 travels upwardly between the gear teeth it is at, and at its highest position, said pawl leaves the gear. Stop means are provided as at 42 and 43, to permit only the required limited swinging movement of the operating member 77. Said operating member and its associated gear structure 62 which has ten teeth in the embodiment shown, together with the plungers 66, 66', constitute an indexing means to turn the shaft 64 one-tenth of a turn per oscillation of said operating member 77.

The gear-like structure 62, in the embodiment shown, has ten teeth, four of which are numbered 62', 62", 62'" and 62"" respectively. The dedendum of each tooth, indicated by the letter D, is of rectangular cross-section. The addendum of each tooth, indicated by the letter A, is of triangular cross-section. The path of the pawl 81, is from outside the gear near one end face of said gear, as is shown in FIG. 3, from where it travels in a circular path between two successive teeth, towards the other end face of the gear, where said pawl comes in contact with the dedendum parts of both said teeth at about the region of the line L in FIG. 10. This is the path taken by the pawl, upon return of the operating member 77 to normal rest position by action of the spring 41. The path of said pawl 81 is the reverse of that just set forth, when the operating member 77 is moved to dispensing position shown in FIG. 3, from its normal rest position where its socket 80 is directly below the hole 40. Each tooth has body for cooperation with said pawl along its entire path of travel aforesaid, but each tooth's addendum is cut away to provide clearance for the operating member 77, so the gear is not interfered with in its turning, and neither is the operating member interfered with in its swinging movement.

To prepare for operation, tablet supply cartridges 18 are mounted, one in each of the adaptors 21–29. Remove the rip strips 76. The bottom tablet of each pack will fall into the hole in the upper disc 60, which is directly below. Assuming that at this time the holes 30, 40 and 50 are aligned, and there being no tablet supply station at the hole 40, the hole 30 will be vacant. Each of the holes 31–39 will have one tablet therein. The steel balls 68, will each be in a socket of the series 69. Upon a turn of the gear 62, one tooth, that is, one-tenth of a revolution, will cause the discs 60 and 61 to turn such part of a revolution. At this time, the holes 31 and 51 will be in alignment with the hole 40. The tablet in the hole 31 will fall through the holes 40 and 51 into the socket 80. It is evident that upon movement of the operating member 77 from its normal rest position indicated at 77", to the position it is shown in by full lines in FIG. 3, that the tablet deposited in the socket 80 becomes exposed to be picked up by the operator, and the spring 41 is stressed, so that upon release of the operating member at its lower position, it will rise and return to its normal rest position 77". It is during the upward movement of the operating member, that the action of the stressed spring 41 in restoring normal condition, has caused the operating member to turn the gear 62 one tooth. The angular distance the rotatable discs 60 and 61 did move, being that between stations, the hole 30 will receive a tablet from the supply held at 29, and all the tablets which were originally deposited in the holes of the disc 60, will have been moved one station. Every time the operating member 77 is moved down and then up, one tablet will be brought forward over the hole 40, will enter the hole 50 and ride on the arcuate periphery of the operating member, while the tablet in the socket 80 is dispensed. This will be repeated until all the tablets have been dispensed, such occurring one at a time.

When the operating member 77 is in normal rest position so its finger piece is at 77", the pawl 81 is at the line L position between for instance, the teeth 62' and 62" of the gear structure 62, and in contact with the dedendums of both said teeth, and each ball 68, spring biased by the compression spring 67, is not quite entirely entered into a socket 69' of the series of sockets in the circle 69. Now when the operating member 77 is shifted by an operator to dispensing position shown in full lines in FIG. 3, where spring 41 is stressed, the pawl 81 will have risen between said teeth 62', 62" and be in position in relation to the tooth 62" as shown in FIG. 11. However, to move the gear structure 62 upon the return of the operating member 77 by action of the spring 41 after the socket 80 has been emptied by the operator, the tooth 62″ must be in a position relative to the pawl 81, as shown in FIG. 12, before the operating member returns to normal rest position, in order for the pawl to enter between the teeth 62″ and 62‴, which cause the gear structure 62 to turn. The said relative position as shown in FIG. 12, is automatically accomplished from that of FIG. 11, because each ball 68, is forced by its spring to enter fully concentrically into the socket 69′, when the gear structure is released for turning movement upon upward movement of the pawl. So when the pawl 81 comes upward, all the way out of between the teeth 62′, 62″, the automatic shift of the gear structure 62, effected by such movement of the spring-biased balls, will present said gear structure so the pawl 81 is positioned to enter between the teeth 62″ and 62‴.

It is to be noted that the holes in the lower disc 61, are merely to provide passage for the dispensed item to fall through the hole 40 in the fixed middle disc or plate 17, to reach the socket 80 in FIG. 3. The member 61 must be with openwork therein to permit such passage from the hole 40, but such openwork need not consist of individual openings under each of the holes in said disc 60, just so long that the contents from each of the holes in disc 60 shall have free passage through hole 40 when it reaches the latter.

The articles to be dispensed may be of any uniform size and the openings in the three discs are of course made to receive one such article through them at a time. The device 15, though specifically shown for use as a tablet dispenser, may be made of suitable dimensions to be used for dispensing other kinds of uniform articles or small packages, which is believed readily understandable to those versed in the art, without the necessity of further illustration.

It is to be noted the number of teeth in the gear structure 62 must equal the number of stations, and that upon each reciprocation of the operating member 77 the gear structure shall have been moved an angular distance equal to 360 degrees divided by the number of stations.

This invention is capable of various forms and applications without departing from the essential features herein disclosed. It is therefore intended and desired that the embodiments shown herein shall be deemed merely illustrative and not restrictive and that the patent shall cover all patentable novelty herein set forth; reference being had to the following claim rather than to the specific showings and description herein to indicate the scope of this invention.

I claim:

In a device for dispensing identical articles one at a time, a frame, a horizontal plate fixed on the frame, a horizontal disc above and next to said plate, a rotatable shaft extending vertically through said plate, a gear structure below said plate; said disc and gear structure being fixed on said shaft concentrically therewith; said disc having a series of holes equi-spaced around an entire circle which is concentric with the shaft; said plate having a single hole which is in registry with one of the holes of said series; said holes being beyond said gear structure; all of said holes being of a size to hold one of said articles respectively, means fixed to the frame to hold vertical stacks of identical articles which are to be dispensed, free for downward movement, one stack immediately above each hole of said series except the one which is in registry with said single hole in said plate; the number of teeth of said gear structure being the number of holes of said series multiplied by any whole number, a sector-shaped swingable, normally at rest operating member biased towards the normal rest position and accessible to be moved to a second position; said operating member being positioned in a vertical plane and mounted on a horizontal axis on the frame so its arcuate periphery is immediately under said one hole in the plate, and having a socket opening in said periphery and directly under said one hole to receive an article passing through said one hole; said socket being accessible when the operating member is moved from its normal rest position; the gear structure having as many teeth as the number of holes in said series, a pawl extending radially outwardly from the periphery of said operating member and positioned between and in contact with the dedendums of two successive teeth of said gear structure; the cross section of each tooth being substantially rectangular and the cross section of the addendum of each tooth being substantially triangular with its apex at the periphery of the gear structure; said plate having a second series of holes equi-spaced around a circle concentric with the shaft; the number of holes in said second series being equal to the number of holes in the first mentioned series multiplied by a whole number, a ball partially entered and fitted within at least one of the holes of the second series and spring-biased towards said plate; said ball and spring being a plunger structure carried on said disc; said pawl being adapted to cooperate with said gear structure at each reciprocation of said operating member to move the gear structure nearly one tooth; said pawl leaving the gear structure before the operating member has reached the second position at which time the ball is not fully seated in a hole of the second series, whereupon the spring biasing the ball, will shift it into concentric seating in said hole of the second series, causing the gear to turn the balance of one tooth movement before the return movement of the operating member; said pawl moving the gear structure only during the return movement of said operating member to its normal rest posiiton.

References Cited
UNITED STATES PATENTS

| | | | |
|---|---|---|---|
| 1,175,357 | 4/1916 | Jaeger | 221—107 |
| 1,489,168 | 4/1924 | Spooner et al. | 221—122 |
| 1,546,077 | 7/1925 | Hunter et al. | 221—265 |
| 1,723,497 | 8/1929 | Zucchelli | 221—113 |
| 1,777,269 | 9/1930 | Webber | 221—293 |
| 1,987,914 | 1/1935 | Smith | 221—113 |
| 2,458,319 | 1/1949 | Uhing | 221—265 |
| 2,508,820 | 5/1950 | Fraley | 221—107 |

FOREIGN PATENTS

| | | |
|---|---|---|
| 1,303,147 | 7/1962 | France. |
| 613,082 | 11/1960 | Italy. |
| 37,232 | 4/1913 | Sweden. |

WALTER SOBIN, *Primary Examiner.*